(12) United States Patent
Lundby

(10) Patent No.: US 6,922,389 B1
(45) Date of Patent: Jul. 26, 2005

(54) METHOD AND APPARATUS FOR REDUCING TRANSMISSION POWER IN A HIGH DATA RATE SYSTEM

(75) Inventor: Stein A. Lundby, Solana Beach, CA (US)

(73) Assignee: QUALCOMM, Incorporated, San Diego, CA (US)

(*) Notice: Subject to any disclaimer, the term of this patent is extended or adjusted under 35 U.S.C. 154(b) by 928 days.

(21) Appl. No.: 09/713,695

(22) Filed: Nov. 15, 2000

(51) Int. Cl.⁷ .......................... H04J 11/00; G01R 31/08
(52) U.S. Cl. ...................... 370/209; 370/252
(58) Field of Search .................. 370/252, 230, 370/209, 335, 332, 352, 333, 320; 375/225, 222

(56) References Cited

U.S. PATENT DOCUMENTS

| | | | | |
|---|---|---|---|---|
| 5,038,399 A | * | 8/1991 | Bruckert | 455/33 |
| 5,491,837 A | * | 2/1996 | Haartsen | 455/62 |
| 5,734,647 A | * | 3/1998 | Yoshida et al. | 370/335 |
| 6,154,659 A | * | 11/2000 | Jalali et al. | 455/522 |

FOREIGN PATENT DOCUMENTS

| | | |
|---|---|---|
| EP | 0713300 | 5/1996 |
| WO | 9923844 | 5/1999 |
| WO | 9965158 | 12/1999 |
| WO | 0057591 | 9/2000 |

* cited by examiner

*Primary Examiner*—Duc Ho
(74) *Attorney, Agent, or Firm*—Philip R. Wadsworth; Thien T. Nguyen

(57) ABSTRACT

In a high data rate communication system, a method and apparatus for selectively reducing the power of signals transmitted by an access terminal. The access terminal generates an access metric based on throughput or data rate control (DRC) information. The access terminal then compares the access metric to an access metric threshold and gates or reduces its transmit power based on the results of the comparison. The access terminal uses algorithms to determine the access metric and access metric threshold that reduce transmit power during periods when the access terminal would not be selected to receive data from an access network according to an access network selection algorithm.

40 Claims, 5 Drawing Sheets

METHOD AND APPARATUS FOR REDUCING TRANSMISSION POWER IN A HIGH DATA RATE SYSTEM

The current invention relates to wireless data communication. More particularly, the present invention relates to a novel method and apparatus for gating or reducing reverse link transmissions in a communication system that supports high data rate (HDR) services.

The word "exemplary" is used exclusively herein to mean "serving as an example, instance, or illustration." Any embodiment described as an "exemplary embodiment" is not to be construed as necessarily preferred or advantageous over other embodiments described herein.

OVERVIEW

The present invention is directed to a method and apparatus for periodically reducing reverse link transmissions in a high data rate (HDR) communication system. An exemplary HDR system is described in U.S. patent application Ser. No. 08/963,386 entitled "METHOD AND APPARATUS FOR HIGH RATE PACKET DATA TRANSMISSION," assigned to the assignee of the present invention, and referred to herein as the '386 application. In the '386 application, a system is described wherein a HDR subscriber station transmits data on a reverse link using a CDMA waveform of multiple orthogonal channels. Each subscriber station sends a reverse link signal containing data rate control (DRC) information. Each base station transmits a forward link signal that is divided into time slots. During each time slot, each base station transmits data to a subscriber station based on DRC information received from that subscriber station.

In an exemplary embodiment, the DRC information is a quantization of the carrier-to-interference (C/I) ratio of the received forward link signal as measured by the subscriber station. Alternatively, the subscriber station may substitute C/I information for the DRC information. The base station may transmit strictly at the data rate dictated by the DRC or C/I information received from a subscriber station, or may choose the data rate based on additional information. If the base station does not adhere to the data rate dictated by the subscriber station, then the subscriber station may decode a rate indicator signal on the forward link or perform some form of blind rate detection.

Figure 1:
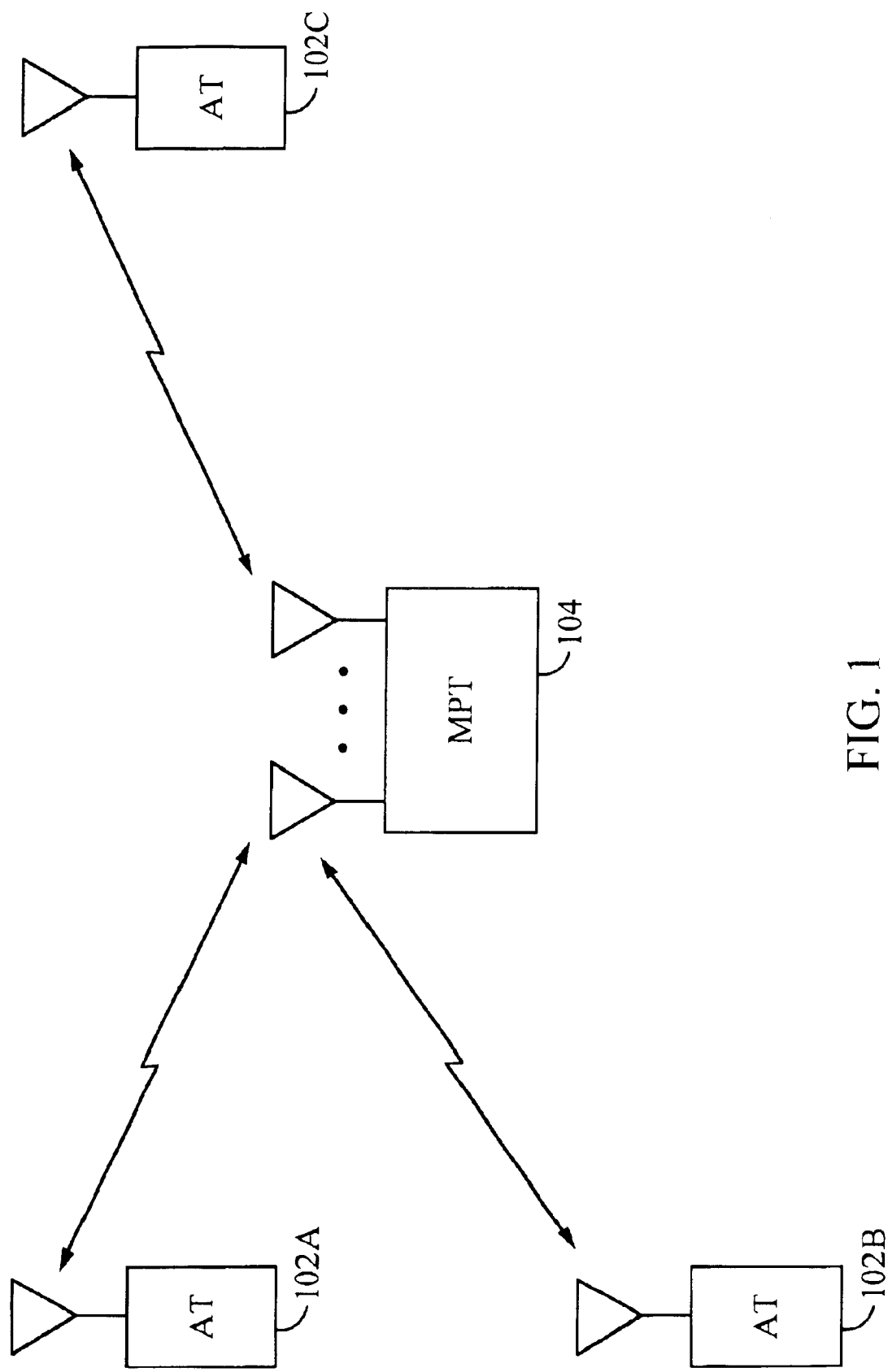
FIG. 1 is a diagram of an exemplary HDR communication system.

FIG. 1 is a diagram of an exemplary HDR communication system. An HDR subscriber station, referred to herein as an access terminals (AT's) 102, may be mobile or stationary, and may each communicate with one or more HDR base stations 104, referred to herein as modem pool transceivers (MPTs). Access terminals 102 transmit and receive data packets through one or more modem pool transceivers 104, to an HDR base station controller (not shown), referred to herein as a modem pool controller (MPC). Modem pool transceiver's and MPC's are parts of a network called an access network. An access network transports data packets between multiple access terminals. The access network may further be connected to additional networks outside the access network, such as a corporate intranet or the Internet, and may thus transport data packets between each access terminal and such outside networks. An access terminal that has established an active traffic channel connection with one or more modem pool transceiver's is called an active access terminal, and is said to be in a traffic state. An access terminal may be any data device that communicates through a wireless channel or through a wired channel, for example using fiber optic or coaxial cables. An access terminal may further be any of a number of types of devices including, but not limited to PC card, compact flash, external or internal modem, or wireless or wireline phone. The communication link through which an access terminal 102 sends signals to a modem pool transceiver 104 is called a reverse link. The communication link through which modem pool transceiver 104 sends signals to access terminal 102 is called a forward link. Reverse link signals transmitted by one access terminal, for example 102a, interfere with reverse link signals transmitted by other access terminals, for example 102b and 102c. This interference limits the reverse link capacity of the HDR system. Gating, as used herein, refers to turning off transmission, or transmitting at approximately zero power, of a signal or signal component.

In order to reduce the interference caused by reverse link transmissions, the access terminal periodically gates or reduces its reverse link transmissions. The periods of gating or reduction are designed such that they occur during periods when forward link and reverse link throughput will not be degraded. For example, an access terminal estimates parameters used by the access network to select an access terminal as a destination of forward link transmissions. An example of such an access network selection algorithm is described in detail in U.S. patent application Ser. No. 09/317,298 entitled "TRANSMITTER DIRECTED, MULTIPLE RECEIVER SYSTEM USING PATH DIVERSITY TO EQUITABLY MAXIMIZE THROUGHPUT," assigned to the assignee of the present invention, referred to herein as the '298 application. The '298 application includes a description of an algorithm that allocates forward link resources such that the throughput of the system is maximized while ensuring that each user is granted equitable access to the communication system.

The selection algorithm used by the access network generally selects an access terminal based on throughput of data transmitted to, and DRC signals received from, all active access terminals. Using the same or a similar selection algorithm, the access terminal calculates an access metric and an access metric threshold in order to predict when the modem pool transceiver is unlikely to select the access terminal to receive forward link data. Rather than transmit a DRC rate that will not result in the access terminal being selected, the access terminal sends a partial reverse link signal with the DRC signal omitted, or perhaps sends no reverse link signal at all. In order to avoid a dropped call, the access terminal limits the time during which it reduces its transmission of reverse link signals to a predetermined maximum transmitter shut-off period. If, after reducing its reverse link transmission, the access terminal's access metric subsequently rises above the access metric threshold, or after the maximum transmitter shut-off period, the access terminal resumes transmitting full reverse link signal.

DETAILED DESCRIPTION

Figure 2A:
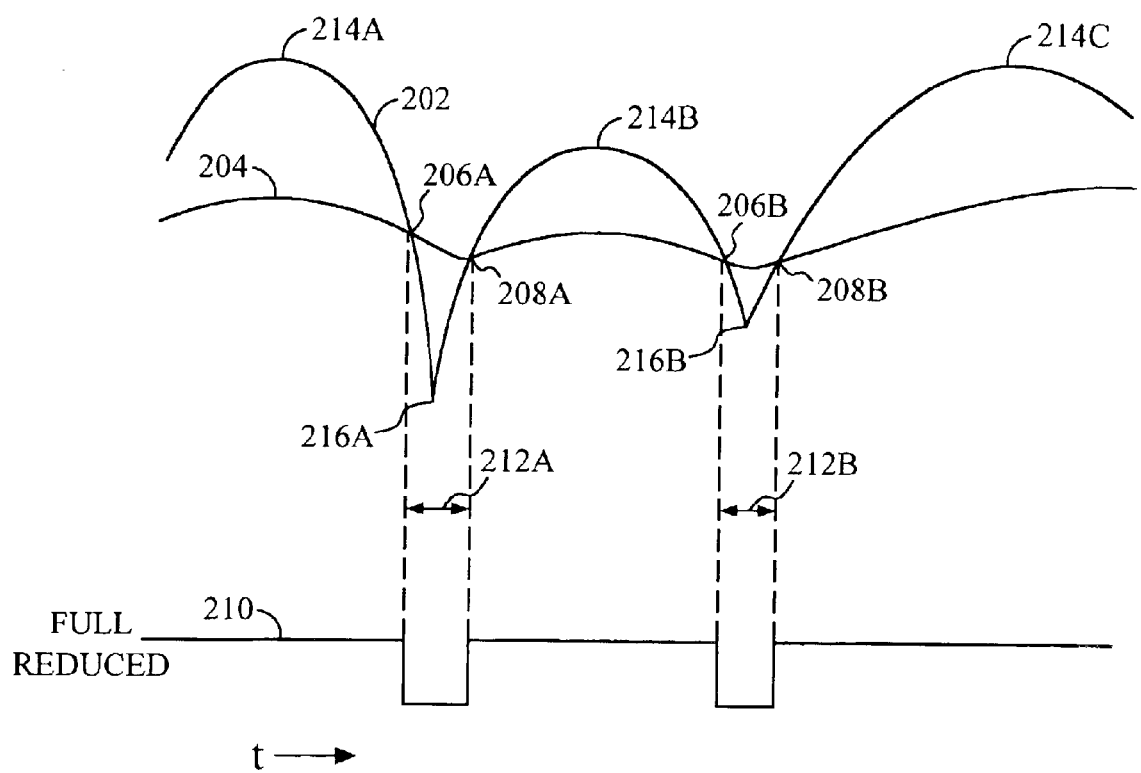
FIG. 2a is a graph of reverse link transmission gating or reduction using an access metric that is based on carrier-to-interference ratio.

FIG. 2a shows an exemplary pattern of reverse link transmission gating or reduction 210 occurring when the access terminal uses an algorithm based on forward link carrier-to-interference (C/I) values 202. The exemplary forward link carrier-to-interference (C/I) curve 202 is shown as a function of time in a typical Rayleigh fading environment. As the access terminal moves within the different areas of modem pool transceiver coverage, fading causes the C/I of the forward link signal received by the access terminal to exhibit round peaks 214 and sharp valleys 216.

In an exemplary embodiment, the access terminal performs low-pass filtering or windowing of the C/I in order to produce an averaged C/I value. For example, the access terminal could create an averaged C/I value by calculating an unweighted average of the C/I values over a predetermined number of prior time slots. Alternatively, the access terminal could generate the averaged C/I value by performing a weighted average of previous C/I values. This averaged C/I value could be used to compute a changing C/I threshold 204 that is compared with the C/I of the current time slot 202, or "current C/I." The C/I value and C/I threshold may be viewed as an "access metric" and an "access metric threshold," respectively, and are used by the access terminal to predict when the access terminal is likely not to be selected to receive forward link data.

At the points 206 where the C/I value drops to a value less than the C/I threshold, then the access terminal stops transmitting a reverse link signal. At the points 208 where the C/I value subsequently rises to a value greater than the C/I threshold, the access terminal begins transmitting a reverse link signal again, including DRC information. In the exemplary figure, the gating pattern 210 shows the gating pattern for reverse link transmission of the access terminal in relation to C/I curve 202 and C/I threshold 204. The gating pattern 210 is high when the access terminal is transmitting a full reverse link signal, and low when the access terminal gates or reduces reverse link transmissions.

The algorithm used to compute the C/I threshold from the averaged C/I value may be constant or may vary over time. For example, the C/I threshold could be simply computed by multiplying the averaged C/I value by a constant k where k<1. In an alternate embodiment, k varies based on the length of time 212 during which the access terminal has stopped transmitting, called a transmitter shut-off period. As the transmitter shut-off period becomes longer, k increases. In an exemplary embodiment, k becomes zero after a predetermined maximum transmitter shut-off period, for example two seconds. Among other benefits, this mitigates undesirable side-effects of shutting off reverse link transmissions, such as termination of the connection by the modem pool transceiver or decreased effectiveness of reverse link power control mechanisms. In an exemplary embodiment, the access terminal ignores reverse link power control commands received in association with time slots falling within the transmitter shut-off period.

In an alternate embodiment, instead of comparing a C/I threshold to a C/I value for a slot, the access terminal compares a DRC rate to a computed selection estimate A. Based on the algorithm used by the access network to select destination access terminals for forward link transmissions, the access terminal uses its own algorithm to compute the selection estimate A. In an exemplary embodiment, the selection estimate is computed based on an average forward link throughput associated with the access terminal. For example, the access terminal may compute the average number of data bytes per second received during the previous 50 forward link time slots (filtered using a finite impulse response, or FIR, filter). Alternatively, the average throughput may be computed using an infinite impulse response, or IIR, filter. This average may be based on the data rate requested by the access terminal. Alternatively, if the protocol used by the access terminal and the access network provides for acknowledgments of forward link data, the access terminal may compute an average throughput based on a data rate granted. With each forward link time slot that passes without the access terminal receiving data, this selection estimate decays.

The selection algorithm used by the access network may be designed to balance the desire to maximize forward link throughput against preventing any access terminal from being starved for forward link data. The access network often uses a selection algorithm based on information maintained for each active access terminal, for example historical forward link throughput and the presence of data in the access terminal's forward link data queue. An access terminal is only eligible for selection if there is data in its forward link data queue. The access network may also use DRC rate information received from the access terminal in selecting a destination access terminal.

In an exemplary embodiment, a modem pool transceiver transmits forward link data to an access terminal during any particular time slot. The modem pool transceiver may alternatively transmit forward link data to more than one access terminal during a time slot. An access terminal is only eligible for selection if there is forward link data that needs to be sent to the access terminal. The access network maintains a forward link data queue for each active access terminal. When there is no forward link data left to send to an access terminal, the forward link data queue associated with that access terminal eventually becomes empty. In an exemplary embodiment, the selection of a destination access terminal is based both on an access metric that the access network maintains for each access terminal and on the condition of the access terminal's forward link data queue. For each modem pool transceiver, an access terminal having a large access metric value (or in many cases, the largest access metric value) is selected from among the access terminals having non-empty forward link data queues to receive forward link transmissions.

Over time, if the number of active access terminals, channel conditions, and data rates remain constant, a steady state network threshold value of access metric value emerges. Any access terminal having an access metric value greater than the network threshold is immediately selected to receive forward link data. Any access terminal having an access metric value less than the network threshold is not selected to receive forward link data.

Figure 2B:
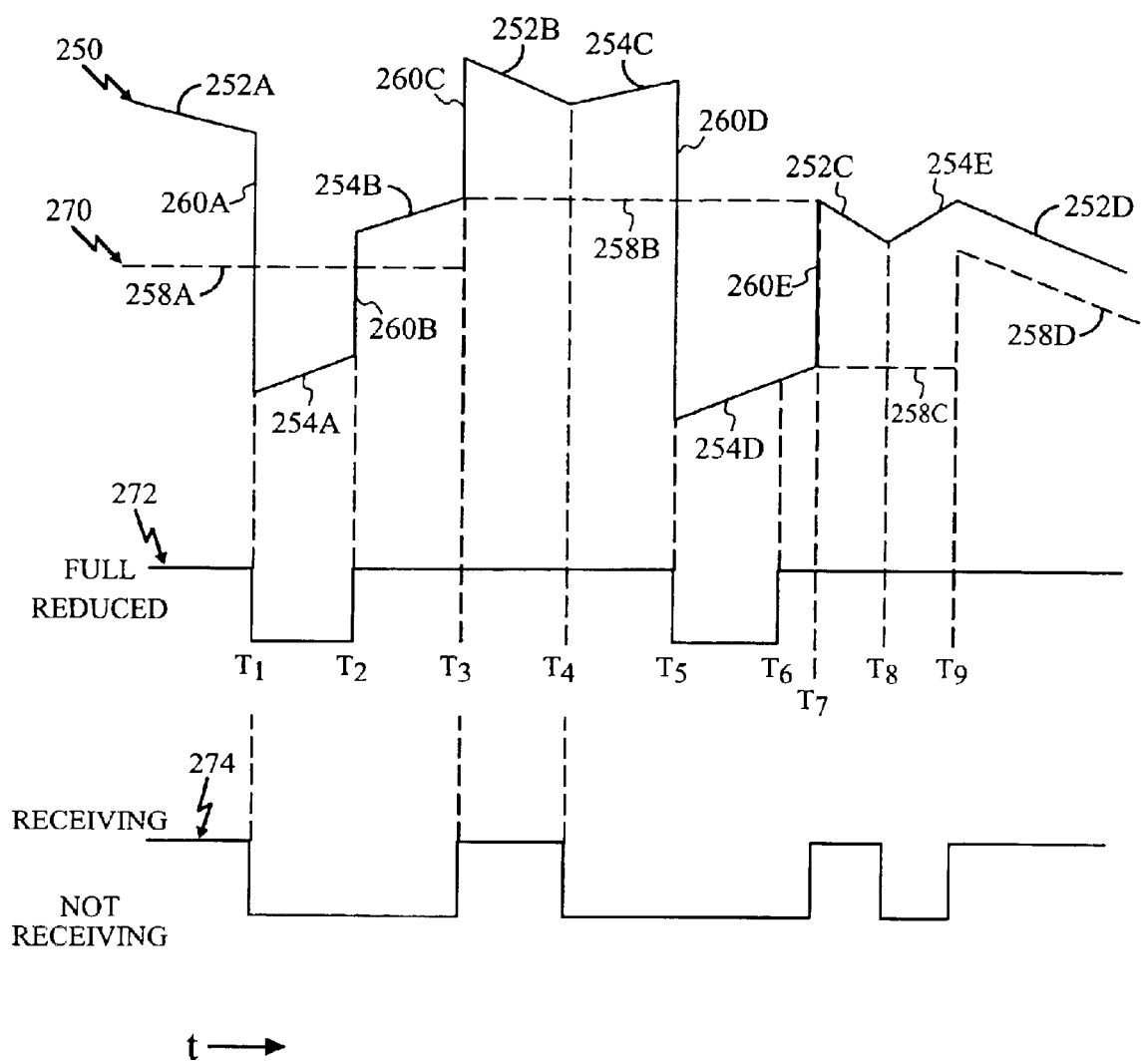
FIG. 2b is a graph of reverse link transmission gating or reduction using an access metric that is based average throughput.

FIG. 2b shows a pattern of reverse link transmission gating using an alternative algorithm. In an exemplary embodiment, reverse link transmission gating or reduction is based on an access metric AM computed as a function of average throughput and measured forward link channel conditions, such as DRC values. The access terminal maintains a dynamically changing access metric threshold $Th_{AM}$. For each slot, the access terminal computes the current value of access metric AM and compares it with the access metric threshold $Th_{AM}$. Based on the comparison, the access terminal determines whether to gate or reduce the reverse link signal transmitted during the next reverse link time slot. Alternatively, the access terminal may gate or reduce a select subset of components of the reverse link signal based on the comparison, for example the DRC signal component.

In an exemplary embodiment, the access terminal reduces or gates its reverse link transmissions whenever AM is less than $Th_{AM}$. In an alternate embodiment, the access terminal reduces or gates its reverse link transmissions whenever AM is less than $S*Th_{AM}$, where S is a scaling factor less than 1. The scaling factor S may be constant or may vary with time. In an exemplary embodiment, S diminishes such that it equals zero after a predetermined maximum transmitter shut-off period, for example two seconds.

In an exemplary embodiment, the access terminal computes the access metric AM based on the equation:

$$AM = ChC/T_{AVG} \qquad \text{Eq. 1}$$

where:

ChC is a measured instantaneous channel condition, for example the DRC value, $T_{AVG}$ is the average throughput value calculated according to Eq. 2, and AM is the access metric value for the current time slot.

In an exemplary embodiment, the average throughput $T_{AVG}$ for a time slot is calculated according to the equation:

$$T_{AVG} \text{ (new)} = [(1-k) \times T_{AVG} \text{ (previous)}] + [(k) \times T_{CUR}] \qquad \text{Eq. 2}$$

where:

k is a filter constant, $T_{AVG}$(new) is the new value of average throughput, $T_{AVG}$(previous) is the previous value of the average throughput, for example the average throughput calculated during the previous time slot, and $T_{CUR}$ is the current value of the data throughput, for example either zero when the access terminal receives no data, or the data rate when the access terminal is receiving data. As discussed above, this through may be either the throughput requested by the access terminal or the throughput granted by the access network.

In an exemplary embodiment as shown in FIG. 2b, the DRC value is used to represent instantaneous channel condition ChC when computing access metric AM 250. In an exemplary embodiment, the DRC value is a data rate chosen from a set of available data rates based on carrier to interference ratio (C/I) measured at the access terminal. Each DRC value is valid over a range of C/I values, and is therefore a quantization of C/I. As shown in Eq. 1, the average throughput is computed in an exemplary embodiment by dividing the channel condition ChC by the average throughput $T_{AVG}$. Though C/I is continuous over time, when C/I crosses a threshold from one DRC rate range into another, the DRC value changes in steps. Consequently, the access metric AM exhibits step changes 260 in value when the DRC value changes.

The average throughput of an access terminal decreases while the access terminal does not receive forward link transmissions, and increases during time slots when the access terminal receives data. Consequently, the access metric AM increases during periods 254 while the access terminal is not receiving forward link data, and decreases during periods 252 while the access terminal is receiving forward link data.

In an exemplary embodiment, the access network selects one destination access terminal per forward link time slot to receive data. An access terminal is only eligible for selection if there is data in its forward link data queue. From among the eligible access terminals, an access terminal is selected that has the greatest access metric value. The access metric value of the access terminal selected by the access network may vary based on additional factors such as the number of active access terminals and received DRC signals. If network conditions remain relatively constant (i.e. the number of active access terminals remains constant, forward link channel conditions are stable, and all access terminals receive data such that their forward link data queues are never empty), the access metric of the access terminal selected for each slot will stabilize to a relatively constant value. An access terminal having an access metric that is less than this stabilized value will not be selected. This stabilized value may be viewed as a network threshold that can be used to predict whether an access terminal having a particular access metric will be selected.

Even when various factors that affect the network threshold are not stable over time, an access terminal can estimate the network threshold. As described above, an access terminal will only be selected to receive forward link data if its access metric value is greater than this access network threshold. In an exemplary embodiment, the access terminal maintains an access metric threshold and uses it to predict whether it might be selected by the access network. In an exemplary embodiment, the access metric threshold is an estimate of the network threshold.

The actual network threshold is a function of the number of active access terminals, the presence of data in each access terminal's forward link data queue, and other changing parameters that are generally unavailable to individual access terminals. The access terminal can only accurately predict whether it will be selected if it has access to the same parameters and uses the same algorithm as the access network. Thus, the access terminal cannot generally predict whether it will be selected with complete accuracy.

Even using an imperfect estimate, an access terminal may increase the reverse link capacity of the network by selectively gating or reducing its reverse link signals. In an exemplary embodiment, the access network provides an access terminal with some of this information to more accurately determine whether it is likely to be selected by the access network. For example, in an exemplary embodiment, the access network periodically transmits on the forward link the number of active access terminals.

Though the accuracy of an access terminal's predictions are best when both access terminal and access network use identical algorithms, one skilled in the art will recognize that the algorithms need not be identical to achieve improved reverse link capacity. In an exemplary embodiment, the access terminal uses an estimate of the network threshold as its access metric threshold. In other embodiments, the access terminal uses an access metric threshold that is not an estimate of the network threshold. Either way, the access terminal limits its transmit power when the access metric is less than the access metric threshold.

The access terminal compares its access metric value to the access metric threshold in order to predict whether it might be selected to receive forward link data. An access metric value that is less than the access metric threshold indicates that the access terminal is unlikely to be selected to receive forward link data at that time, or during the next forward link time slot. If the access terminal determines that it is unlikely to be selected and has no reverse link data to transmit, then the access terminal minimizes its contribution to reverse link interference by reducing the power of its reverse link signal. In an exemplary embodiment, the access terminal reduces reverse link transmission power by transmitting only a subset of reverse link signal components, for example only a reverse link pilot. In an alternate embodiment, the access terminal may elect to refrain from sending a reverse link signal entirely for a period of time.

The exemplary graph in FIG. 2b shows access metric AM in graph line 250, access metric threshold in dotted graph line 270, and transmitter state in graph line 272 in accordance with an exemplary embodiment. The transmitter state 272 is high while the access terminal is transmitting a reverse link signal and low during periods while the access terminal gates or reduces its reverse link signal. Additionally in FIG. 2b, graph line 274 shows whether the access terminal has been selected and is receiving forward link data from the access network. When graph line 274 is high, the access terminal is receiving forward link data. When graph line 274 is low, the access terminal is not receiving forward link data.

In FIG. 2b, the access metric threshold 272 begins at a value 258a that is less than that of access metric 250. While the access terminal is receiving forward link data, its access metric steadily decreases 252a. At time $T_1$, the channel conditions degrade such that the DRC value is decreased. The channel conditions could degrade for any of a number of reasons including Rayleigh fading caused by multipath interference, an object appearing in the direct path between the access terminal and the modem pool transceiver, or increased distance between the access terminal and the transmitting modem pool transceiver. The decrease in DRC causes the access metric to drop below the access metric threshold 258a at time $T_1$. Consequently, at time $T_1$, the access terminal stops transmitting as shown in the graph of transmitter state 272. During this period, the access terminal does not transmit a DRC signal, and therefore receives no forward link data.

While the access terminal is not receiving data, the access metric gradually increases as shown. At time $T_2$, the DRC value changes to a greater value, and the access metric increases 260b. At time $T_2$, the access metric takes on a value greater than the access metric threshold. Based on the comparison between the access metric and the access metric threshold, the access terminal resumes transmitting a reverse link signal. In the example, although the access metric is greater than the access metric threshold, the access terminal does not receive forward link data. This could mean either that the network has no forward link data to send the access terminal or that the actual network threshold is greater than the access metric threshold. While the access terminal is not receiving data, the access metric steadily increases 254b.

At time $T_3$, the DRC value increases again, causing another step increase 260c in the access metric. At the new access metric value, the access network immediately begins sending forward link traffic to the access terminal. In the example, the access terminal then adjusts its access metric threshold to equal the greatest access metric value 258b reached during the period 254b immediately preceding the jump in DRC value at time $T_3$. In an alternate embodiment, the access terminal adjusts its access metric threshold to the same greatest access metric value 258b, less a predetermined guard value, for example 3 dB.

While the access terminal is receiving forward link data, the access metric value steadily decreases 252b. At time $T_4$ the access terminal stops receiving forward link data, either because another access terminal is being served by the modem pool transceiver or because there is no more forward link to send. While the access terminal is not receiving forward link data, the access metric steadily increases 254c.

At time $T_5$, the DRC value drops significantly, causing a step decrease 260d in the access metric. The new access metric value is less than the access metric threshold, so the access terminal stops transmitting a reverse link signal. During this period, the access terminal does not transmit a DRC signal, and therefore receives no forward link data. While the access terminal does not receive forward link data, the access metric steadily increases 254d.

As discussed above, it is undesirable to the access terminal to shut off its transmitter for too long. In the example, the access terminal turns its transmitter back on after a maximum transmitter shut-off period even if the access metric is still less than the access metric threshold. In the example, the maximum transmitter shut-off period ends at time $T_6$. At that time, the access terminal resumes transmitting a reverse link signal, even if the access metric is still less than the access metric threshold At time $T_7$, the DRC value increases again, causing another step increase 260d in the access metric. At the new access metric value, the access terminal immediately begins receiving forward link traffic from the access network. In the example, the access terminal then adjusts its access metric threshold to equal the greatest access metric value 258c reached during the period 254d immediately preceding the jump in DRC value at time $T_7$. In an alternate embodiment, the access terminal adjusts its access metric threshold to the same greatest access metric value 258c, less a predetermined guard value, for example 3 dB.

While the access terminal is receiving forward link data, the access metric value steadily decreases 252c. At time $T_8$ the access terminal stops receiving forward link data, either because another access terminal is being served by the modem pool transceiver or because there is no more forward link to send. While the access terminal is not receiving forward link data, the access metric calculated in the access terminal steadily increases 254e.

At time $T_9$, the access network begins sending forward link data to the access terminal again. Because the beginning of transmission does not coincide with a sudden increase in the access metric, the access terminal assumes that the network threshold is less than or equal to the current access metric value. The access terminal sets its access metric threshold to a value that is less than the current access metric value by a predetermined guard value, for example 3 dB. While the access terminal is receiving forward link data, the access metric value steadily decreases 252d. At the same time, the access metric threshold decreases 258d such that it remains less than the access metric value by the guard value.

As mentioned above, refraining from sending any reverse link signal for a prolonged period is generally undesirable. One reason is that it interferes with reverse link power control algorithms. Another is that if the access network receives no reverse link signal from an access terminal, it may assume that its communication link with the access terminal has been lost. Consequently, the access network will terminate its connection with the access terminal.

In an exemplary embodiment, while an access terminal is transmitting no reverse link signal, the access terminal ignores associated reverse link power control commands from the access network. In an alternate embodiment, the modem pool transceiver algorithms ignore frame errors on the reverse link if the modem pool transceiver determines that the access terminal has gated or reduced its reverse link transmissions. This prevents the power control algorithm at the modem pool transceiver from erroneously increasing its outerloop set point.

In an exemplary embodiment, the access terminal refrains from sending any reverse link signal during a period in which its access metric is less than the access metric threshold. If, however, this period lasts longer than a predetermined maximum transmitter shut-off period, the access terminal turns its transmitter back on again. The access terminal continues transmitting a reverse link signal for at least a predetermined minimum transmitter restoration period, for example 5 milliseconds. The minimum transmitter restoration period is designed to ensure that the access network will not terminate its connection with the access terminal because of the transmitter shut-off, and to allow the modem pool transceiver searcher to accurately track reverse link multipath components.

In an exemplary embodiment where an access terminal refrains from sending any reverse link signal for a period, it may also be advantageous after such a period to resume transmitting some signals before resuming transmitting others. For example, an access terminal may resume transmitting a pilot signal before resuming transmission of other reverse link signal components. This practice enables preloading of pilot filters and multipath tracking within the modem pool transceiver.

In any of the embodiments described above, the access terminal may determine its access metric threshold based on parameters that apply to one or more other access terminals. In an exemplary embodiment, such parameters are periodically received from the access network. These parameters may include, but are not limited to, the number of active users being serviced by a modem pool transceiver or by the access network, or the access metric or average throughput value of the previously selected access terminal. One skilled in the art will appreciate that the particular additional parameters received from the access network may be different than the parameters described above without departing from the methods described herein.

One skilled in the art will recognize that the values discussed above, such as maximum transmitter shut-off period and minimum transmitter restoration period, are used only as examples and may be changed without departing from the described embodiments. In addition, reducing various other combinations of reverse link signal components than those specifically described should be viewed as within the scope of the described embodiments.

Figure 3:
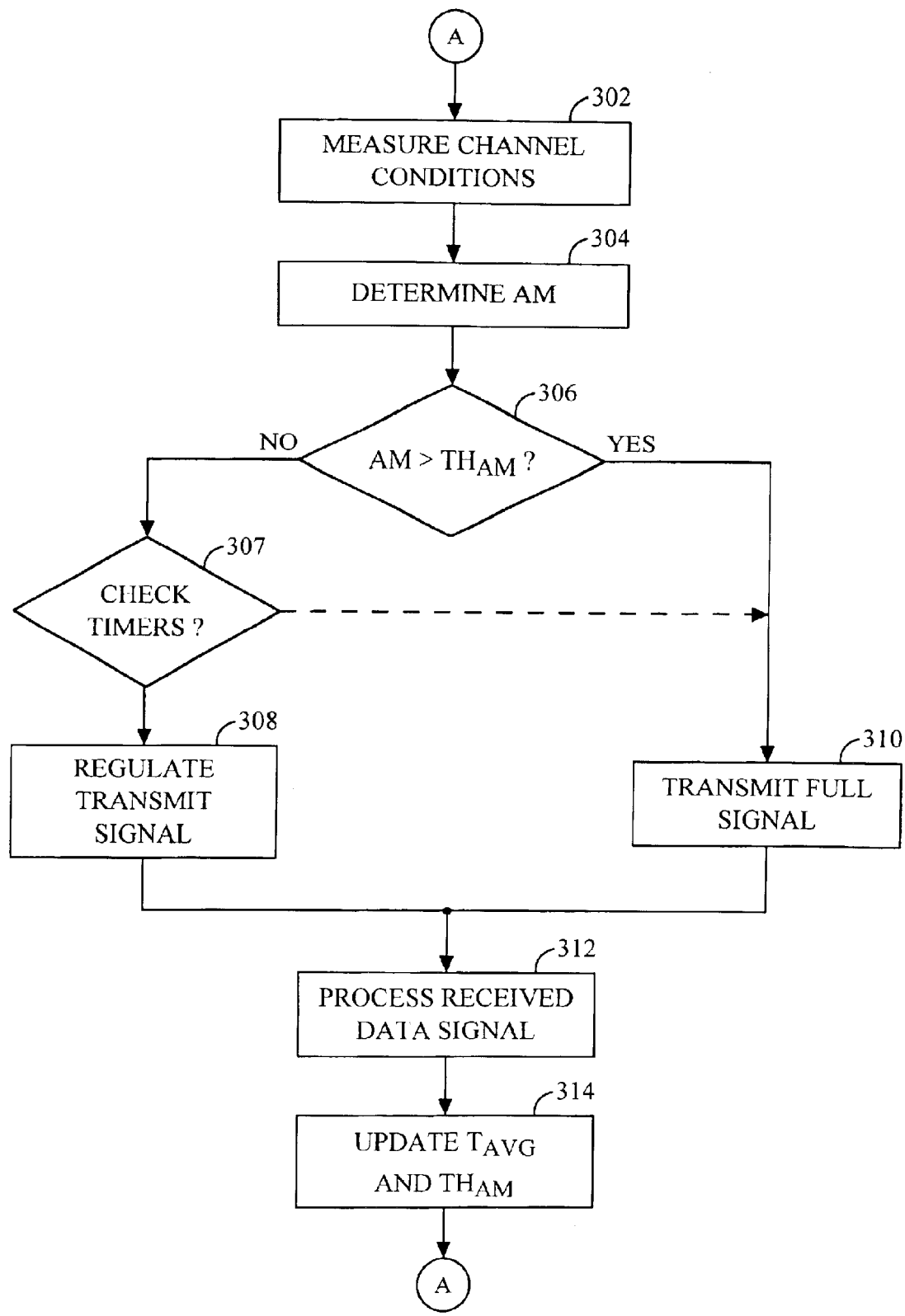
FIG. 3 is a flowchart of a method to determine when to gate or reduce reverse link transmissions.

FIG. 3 is a flowchart showing an access terminal method for determining when to reduce or entirely shut off reverse link transmissions. For each forward link time slot, the access terminal measures the forward link channel conditions at step 302. The parameters measured and used to determine forward link channel conditions include such parameters as carrier-to-interference (C/I) of the received signal and received signal power. From the channel condition measurements, the access terminal determines, at step 304, an access metric AM value. In an exemplary embodiment, AM is calculated using a data rate control (DRC) value and an average throughput value as described above.

At step 306, the access terminal compares the new AM value to an access metric threshold $TH_{AM}$, to determine whether to transmit a full reverse link signal. If AM is greater than $TH_{AM}$, then at step 310 the access terminal transmits a full reverse link signal. In an exemplary embodiment, a full reverse link signal includes pilot and DRC information. If AM is less than $TH_{AM}$, then the access terminal checks, at step 307, whether its reverse link transmissions had already been reduced in the previous reverse link time slot. If reverse link transmissions were already being reduced, the access terminal determines for how long they have been reduced. The duration of the reduction is compared to a maximum transmitter shut-off period. If the duration of the reduction is greater than the maximum transmitter shut-off period, then the access terminal resumes transmitting a full reverse link signal at step 310.

In an exemplary embodiment, the access terminal also limits the length of time that it transmits a full reverse link signal while AM is less than $TH_{AM}$. At step 307, the access terminal checks timers to determine whether to reduce reverse link signal transmissions at step 308 or to transmit a full reverse link signal at step 310. For example, during a long period during which AM remains less than $TH_{AM}$, an access terminal reduces its reverse link transmissions for the maximum transmitter shutoff period. After that, if AM is still less than $TH_{AM}$ for a minimum transmitter restoration period, the access terminal again reduces its reverse link transmissions. This cycle of restoring full reverse link signal transmissions after a maximum transmitter shut-off period and reducing reverse link signal transmissions after a minimum transmitter restoration period continues until AM becomes greater than $TH_{AM}$.

As described above, at step 308 the access terminal may reduce its reverse link transmissions in different ways. In an exemplary embodiment, the access terminal gates, or stops transmitting, all components of the full reverse link signal. In another embodiment, the access terminal transmits a reverse link signal that is complete except for lack of the DRC component. In other embodiments, the access terminal transmits some other subset of reverse link signal components. Alternatively, the access terminal may transmit some or all of the reverse link signal components at a reduced power level, but not gate them entirely.

In an exemplary embodiment, the access terminal stops transmitting all components of the reverse link signal, but resumes transmitting the pilot signal before resuming other channels. This allows pre-loading of pilot filters at the modem pool transceiver.

After either transmitting a full reverse link signal at step 310 or transmitting a reduced reverse link signal at step 308, the access terminal processes any received forward link data at step 312 and updates $T_{AVG}$ and $TH_{AM}$ at step 314. Then, the access terminal begins the processing of the next time slot again by measuring forward link channel conditions at step 302.

Whether or not the access terminal transmits a full reverse link signal, the access network may continuously send reverse link power control commands to the access terminal. If the access network bases reverse link power control commands on signal components that were gated or sent at reduced power, those power control commands will not accurately reflect the reverse link channel conditions. In an exemplary embodiment, the access terminal ignores or performs special processing on any reverse link power control commands associated with periods during which the access terminal was not transmitting a full reverse link signal.

Figure 4:
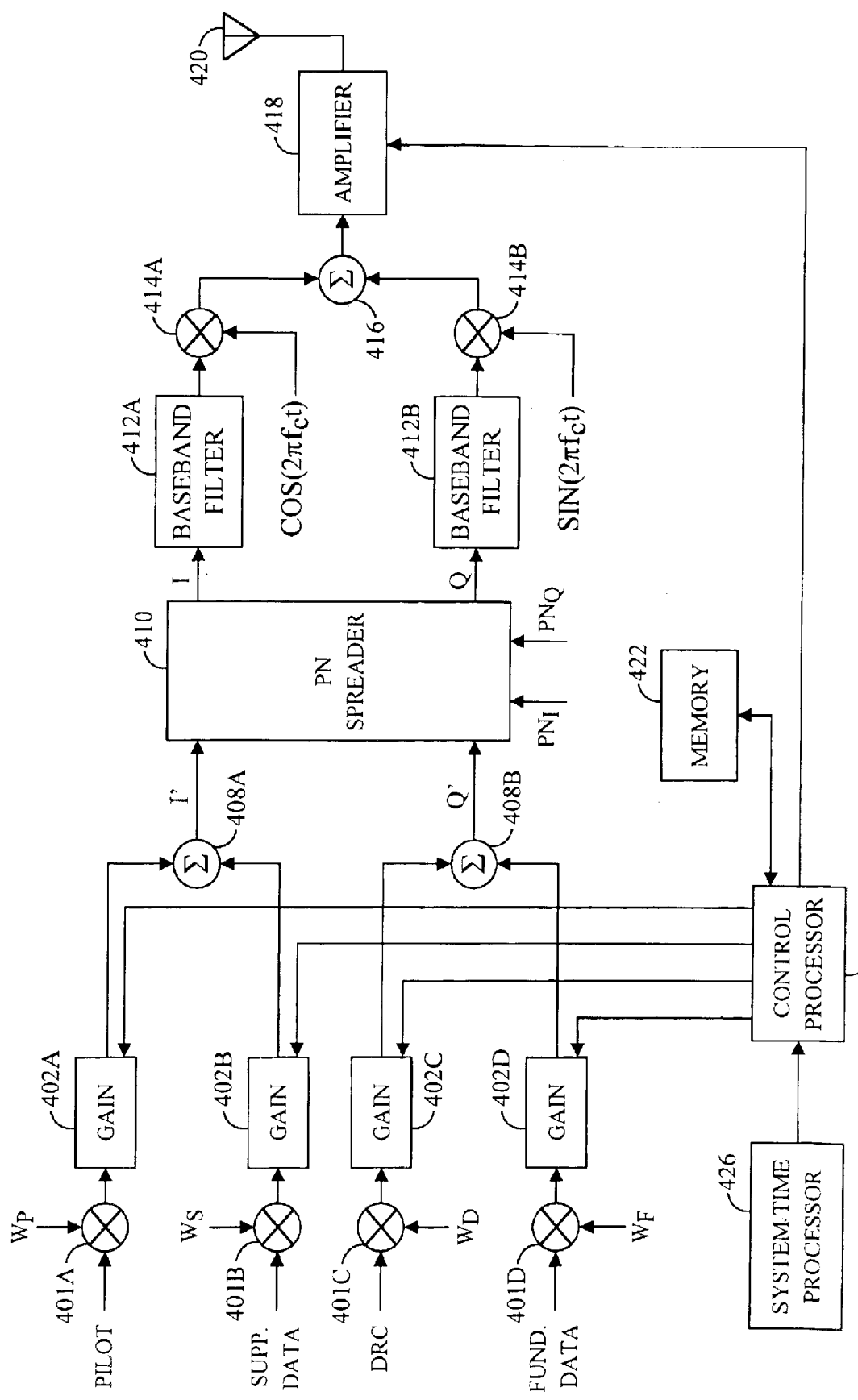
FIG. 4 is a diagram of an access terminal apparatus.

FIG. 4 shows an exemplary access terminal apparatus. In an exemplary embodiment as shown, apparatus, pilot, supplemental data, data rate control (DRC), and fundamental data signals are spread with a Walsh code, gain-controlled, and added together before being spread in complex pseudonoise (PN) spreader 410. The pilot signal is multiplied by a pilot Walsh code $W_P$ in Walsh spreader 401a and gain-controlled in gain block 402a. The supplemental data signal is multiplied by a supplemental data Walsh code $W_S$ in Walsh spreader 401b and gain-controlled in gain block 402b. The DRC signal is multiplied by a DRC Walsh code $W_D$ in Walsh spreader 401c and gain-controlled in gain block 402c. The fundamental data signal is multiplied by a fundamental data Walsh code WF in Walsh spreader 401d and gain-controlled in data gain block 402d.

In an exemplary embodiment, Walsh spreaders 401 are implemented as multipliers that multiply the different Walsh codes by the pilot, DRC, and supplemental and fundamental data signals. Prior to Walsh spreading, the pilot, DRC, and supplemental and fundamental data signals are converted into signal point mapped values, for example +1 and −1. In an alternate embodiment, signal point mapping occurs immediately prior to gain-controlling in gain blocks 402. In such an alternate embodiment, Walsh spreaders 401 perform an XOR function with the Walsh covers instead of multiplying. In an alternate embodiment, the pilot signal is spread using a "Walsh function zero" or $W_0$, which is actually no spreading at all. In such an alternate embodiment, Walsh spreader 401a may be omitted.

The gain-controlled signals produced by gain blocks 402a and 402b are added together to form the output of summer 408a. The gain-controlled signals produced by gain blocks 402c and 402d are added together to form the output of summer 408b. The output of summer 408a provides the in-phase (I') or "real" component of the signal multiplied by the complex PN code in PN spreader 410. The output of summer 408b provides the quadrature-phase (Q') or "imaginary" component of the signal multiplied by the complex PN code in PN spreader 410. The output of complex PN spreader 410 is a complex signal having I and Q components. Each of these components is filtered using a baseband filter 412a and 412b before being upconverted in mixers 414a and 414b. The upconversion in mixers 414a and 414b is accomplished by multiplying the outputs of baseband filters 412a and 412b by sine and cosine signals as shown. The outputs of mixers 414 are then added in summer 416 to form the upconverted reverse link signal to be amplified in amplifier 418 and transmitted through antenna 420.

The gain levels applied to the various signals by gain blocks 402 are controlled by control processor 424. Control processor 424 receives timing information such as slot timing from system time processor 426. Control processor 414 then determines when to gate or reduce reverse link transmissions according to one of the algorithms or embodiments described above. Control processor 426 then compares the access metric with an access metric threshold and gates or reduces the transmit power of reverse link signals based on the comparison. In an exemplary embodiment, control processor 424 uses parameters received from the access network that apply to one or more other access terminals to determine the access metric threshold.

In general, control processor 424 gates or reduces reverse link transmissions during periods in which the access metric is less than the access metric threshold. In an exemplary embodiment, control processor 424 uses timing information from system processor 426 to regulate the duration of the period during which reverse link transmissions are gated or reduced. For example, if this period lasts longer than a predetermined maximum transmitter shut-off period, the control processor 424 causes the access terminal to resume transmitting a full reverse link signal. In an exemplary embodiment, control processor 424 causes such resumed full reverse link signal transmissions to continue for at least a predetermined minimum transmitter restoration period, for example.

In an exemplary embodiment, control processor 424 completely gates reverse link transmissions by directing each of the gain blocks 402 to apply approximately zero gain to their respective input signals. Alternatively, control processor 424 may instead cause amplifier 418 to stop transmitting or to transmit at approximately zero power. As described above, after having gated the reverse link signal, the access terminal may resume transmitting a pilot signal before resuming transmissions of other reverse link signal components. Control processor 424 causes pilot transmissions to resume first by setting the gains in gain blocks 402b, 402c, and 402d to approximately zero while setting the gain in pilot gain block 402a to a non-zero value. In an alternate embodiment, pilot gain block 402a is omitted such that only non-pilot signals are gated or reduced.

In an alternate embodiment, according to one of the algorithms described above, control processor 424 gates or reduces the gains of only a subset of the reverse link signal components. In an exemplary embodiment, only non-pilot signals are gated or transmitted at reduced power using gain blocks 402b, 402c, and 402d to attenuate those signals.

In an exemplary embodiment, control processor 424 also executes a reverse link power control algorithm based on reverse link power control commands received from one or more modem pool transceivers. According to this algorithm, control processor 424 regulates reverse link power using either gain blocks 402 or amplifier 418 or both to change reverse link power. In an exemplary embodiment, control processor 424 either ignores or performs special processing on any reverse link power control commands associated with periods during which the access terminal was not transmitting a full reverse link signal.

One skilled in the art will recognize that the gain-controlled channel signals may be combined differently prior to PN spreader 410 without departing from the described embodiment. For example, summer 408a may add the gain-controlled outputs of gain blocks 402a and 402c instead of 402a and 402b. Alternatively, some signals might be separately gain-controlled and added to both real and imaginary components output by summers 408a and 408b.

In an exemplary embodiment, PN spreader 410 complex-multiplies the outputs of summers 408a and 408b by a complex PN code having components $PN_I$ and $PN_Q$ according to the equations:

$$I=I'PN_I-Q'PN_Q$$

$$Q=I'PN_Q+Q'PN_I$$

In an alternate embodiment, PN spreader 410 multiplies the outputs of summers 408a and 408b by a single real PN sequence according to the equations:

$$I=I'PN$$

$$Q=Q'PN$$

In other embodiments, some other complex or real multiplication equations are used.

In an exemplary embodiment, control processor 424 is a microprocessor, microcontroller, DSP or similar device capable of executing a series of software instructions stored in an electronic medium. In an exemplary embodiment, control processor 424 executes code stored in a memory, for example, memory 422. Control processor 424 may also store temporary values such as access metrics, access metric thresholds, and associated variables in memory 422. In addition, control processor 424 may store temporary values such as reverse power control parameters and timer values associated with maximum transmitter shut-off timer or minimum transmitter restoration timers.

In the embodiments described above, each access terminal sends a reverse link signal to one or more modem pool transceivers. Each modem pool transceiver uses these signals to determine which access terminals will receive forward link transmissions during each forward link time slot. A modem pool transceiver also uses these reverse link signals to determine the greatest data rates at which forward link data may be sent to any access terminal. The reverse link signals may contain DRC information or C/I information, referred to generally as data request information. One skilled in the art will recognize that the data request information may take other forms without departing from the scope of the present invention. For example, an access terminal may transmit symbol error rates or a Yamamoto metric of received forward link signals as data request information.

In an exemplary embodiment, each modem pool transceiver in the access network directs forward link transmissions to one access terminal at a time using a data rate dictated by data request information received from destination access terminal. In such an embodiment, the access terminal demodulates the forward link at a data rate based solely on previously transmitted data request information. Alternatively, the access network may transmit forward link data at a rate other than the rate dictated by the data request information received from destination access terminal. For example, each modem pool transceiver may transmit forward link data to more than one access terminal at data rates chosen by the access network. The destination access terminals determine the rate at which to demodulate the forward link signals by performing blind rate detection or by decoding separate rate indicator signals received from the access network.

The components in the described apparatus embodiments are described in general terms to illustrate the flexibility of the present invention. Each described component may be implemented using one or a combination of general-purpose microprocessors, digital signal processors (DSP), programmable logic devices, application specific integrated circuits (ASIC), or any other device capable of performing the functions described herein. Though described in terms of a wireless communication system, the embodiments and ideas described herein may also be utilized in a network in which network nodes communicate using other technologies, for example fiber optics, coaxial cable or other wire-line technology.

Thus, the present invention is not intended to be limited to the embodiments shown herein but is to be accorded the widest scope consistent with the principles and novel features disclosed herein.

What is claimed is:

1. A method of receiving data transmitted from an access network to an access terminal, the method comprising:
   measuring at the access terminal at least one parameter of a signal received from the access network;
   determining an access metric value based on said measuring;
   generating data request information based on said measuring;
   comparing the access metric value to an access metric threshold;
   estimating, based on said comparing, that communicating the data request information to the access network will not result in selection of the access terminal by the access network; and
   reducing the power of a reverse link signal transmitted from the access terminal to the access network based on said estimating.

2. The method of claim 1 further comprising updating the access metric threshold based on said value of an access metric.

3. The method of claim 1 wherein said measuring further comprises low-pass filtering a forward link data throughput value.

4. The method of claim 3 wherein said low-pass filtering is performed using a finite impulse response filter.

5. The method of claim 3 wherein said low-pass filtering is performed using an infinite impulse response filter.

6. The method of claim 3 wherein said forward link data throughput value is based on a data rate requested by the access terminal.

7. The method of claim 3 wherein said forward link data throughput value is based on a data rate granted by the access network.

8. The method of claim 3 further comprising updating the access metric threshold based on the forward link data throughput value.

9. The method of claim 1 further comprising:
   receiving an access metric parameter from the access network; and
   updating the access metric threshold based on the access metric parameter.

10. The method of claim 9 wherein the access metric parameter is a number of access terminals receiving forward link data from a modem pool transceiver.

11. The method of claim 9 wherein the access metric parameter is an access network metric value associated with a previous forward link data transmission.

12. The method of claim 1 further comprising:
   receiving a power control command from the access network at a receiving time;
   comparing the receiving time with the time of said reducing; and
   processing the power control command in accordance with said comparing.

13. The method of claim 1 wherein said data request information comprises a data rate control value.

14. The method of claim 1 wherein said data request information comprises a carrier-to-interference ratio.

15. The method of claim 1 wherein said reducing further comprises gating a data request information signal based on said estimating, wherein the reverse link signal comprises a plurality of signal components, and wherein the data request information signal is one of the plurality of signal components.

16. The method of claim 15 wherein said reducing further comprises gating an additional signal component of the plurality of signal components at the same time as said gating a data request information signal.

17. The method of claim 1 wherein the reverse link signal comprises a plurality of signal components, wherein the plurality signal components comprises a pilot signal, and wherein said reducing further comprises gating all of said plurality of signal components at the same time as said gating the data request information signal.

18. The method of claim 17 further comprising:
   resuming transmission of said pilot signal; and
   resuming transmission of at least one other of said plurality of signal components a predetermined period after said resuming transmission of said pilot signal.

19. The method of claim 1 further comprising:
   monitoring the length of time during which the power of the reverse link signal is reduced in accordance with said reducing; and
   discontinuing said reducing when the length of time exceeds a predetermined maximum transmitter shut-off period.

20. The method of claim 1 further comprising multiplying the reverse link signal by a PN code.

21. The method of claim 1 further comprising complex-multiplying the reverse link signal by a complex PN code.

22. An access terminal apparatus comprising:
   a data request gain module configured to gain-control a data request information signal, based on a data request gain control signal, to produce a gain-controlled data request information signal; and a control processor configured to generate an estimate of whether transmitting the data request information signal would result in selection of the access terminal by the access network, and to alter the gain control signal based on the estimate;

a control processor configured to determine an access metric value based on measurements of at least one parameter of a signal received from the access network, generate data request information based on the measurements, compare the access metric value to an access metric threshold, estimate that communicating the data request information to the access network will not result in selection of the access terminal by the access network, and to alter the gain control signal based on the estimate.

23. The apparatus of claim 22 further comprising a Walsh spreader configured to spread the data request information signal using a Walsh code.

24. The apparatus of claim 22 wherein the control processor is further configured to determine an average throughput value, and to generate the estimate based on the average throughput value.

25. The apparatus of claim 22 wherein the control processor is further configured to determine an access metric value and an access metric threshold value, and to generate the estimate based on comparing the access metric value to the access metric threshold.

26. The apparatus of claim 25 wherein the control processor is further configured to update the average throughput value based on at least one access metric parameter received from an access network.

27. The apparatus of claim 25 wherein the control processor is further configured to update the average throughput value based on a number received from an access network, wherein the number corresponds to a number of access terminals receiving forward link data from a modem pool transceiver.

28. The apparatus of claim 25 wherein the control processor is further configured to update the average throughput value based on an access network access metric value received from an access network.

29. The apparatus of claim 22 further comprising a pilot gain module configured gain-control a pilot signal component based on a pilot gain control signal to produce a gain-controlled pilot signal, wherein the control processor is further configured to alter the pilot gain control to gate the pilot signal based on the estimate.

30. The apparatus of claim 29 wherein the control processor is further configured to alter the pilot gain control to increase the gain of the pilot signal at a first time, and to alter the data request gain control signal to increase the gain of the data request information signal at a second time, wherein the second time is a predetermined duration later than the first time.

31. The apparatus of claim 22 further comprising a PN spreader configured to multiply the data request information signal by a PN code.

32. The apparatus of claim 22 further comprising a complex PN spreader configured to complex-multiply the data request information signal by a complex PN code.

33. An access terminal apparatus comprising:

an amplifier configured to gate an upconverted signal based on a gating control signal; and a control processor configured to generate an estimate of whether transmitting a data request information signal would result in selection of the access terminal by the access network, and to alter the gating control signal based on the estimate.

34. The apparatus of claim 33 wherein the control processor is further configured to determine an average throughput value, and to generate the estimate based on the average throughput value.

35. The apparatus of claim 33 wherein the control processor is further configured to determine an access metric value and an access metric threshold value, and to generate the estimate based on comparing the access metric value to the access metric threshold.

36. The apparatus of claim 35 wherein the control processor is further configured to update the average throughput value based on at least one access metric parameter received from an access network.

37. The apparatus of claim 35 wherein the control processor is further configured to update the average throughput value based on a number received from an access network, wherein the number corresponds to a number of access terminals receiving forward link data from a modem pool transceiver.

38. The apparatus of claim 35 wherein the control processor is further configured to update the average throughput value based on an access network access metric value received from an access network.

39. The apparatus of claim 33 further comprising a PN spreader configured to multiply the data request information signal by a PN code.

40. The apparatus of claim 33 further comprising a complex PN spreader configured to complex-multiply the data request information signal by a complex PN code.

* * * * *